United States Patent
Alba et al.

(10) Patent No.: US 10,733,224 B2
(45) Date of Patent: *Aug. 4, 2020

(54) AUTOMATIC CORPUS SELECTION AND HALTING CONDITION DETECTION FOR SEMANTIC ASSET EXPANSION

(71) Applicant: International Business Machines Corporation, Armonk, NY (US)

(72) Inventors: Alfredo Alba, Morgan Hill, CA (US); Clemens Drews, San Jose, CA (US); Daniel F. Gruhl, San Jose, CA (US); Linda H. Kato, San Jose, CA (US); Neal R. Lewis, San Jose, CA (US); Pablo N. Mendes, San Jose, CA (US); Meenakshi Nagarajan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 15/426,244

(22) Filed: Feb. 7, 2017

(65) Prior Publication Data

US 2018/0225373 A1    Aug. 9, 2018

(51) Int. Cl.
  *G06F 16/36* (2019.01)
  *G06F 7/08* (2006.01)
  *G06F 16/35* (2019.01)

(52) U.S. Cl.
  CPC .............. *G06F 16/36* (2019.01); *G06F 7/08* (2013.01); *G06F 16/353* (2019.01)

(58) Field of Classification Search
  CPC ........... G06F 16/353; G06F 16/36; G06F 7/08
  See application file for complete search history.

(56) References Cited

U.S. PATENT DOCUMENTS

| | | |
|---|---|---|
| 5,317,507 A | 5/1994 | Gallant |
| 5,983,216 A | 11/1999 | Kirsch et al. |

(Continued)

FOREIGN PATENT DOCUMENTS

CA    2340531 C    10/2006

OTHER PUBLICATIONS

List of IBM Patents or Patent Applications Treated as Related, Dec. 8, 2017, 2 pages.

(Continued)

*Primary Examiner* — Miranda Le
(74) *Attorney, Agent, or Firm* — Stephen J. Walder, Jr.; Stephen R. Tkacs; Ryan Lewis (57) ABSTRACT

A mechanism is provided in a data processing system comprising at least one processor and at least one memory, the at least one memory comprising instructions executed by the at least one processor to cause the at least one processor to implement an automated lexicon expansion for an identified corpus. For a selected corpus in a set of corpora, the mechanism determines an estimated number of new terms in the selected corpus that are not in the lexicon based on a frequency count known terms in the selected corpus. Responsive to the estimated number of new terms in the selected corpus being greater than a threshold, the mechanism performs lexicon expansion using the selected corpus to form an expanded lexicon. Responsive to the estimated number of new terms in the selected corpus not being greater than the threshold, the mechanism halts lexicon expansion.

8 Claims, 5 Drawing Sheets

(56) References Cited

U.S. PATENT DOCUMENTS

| | | | |
|---|---|---|---|
| 6,778,995 B1 | 8/2004 | Gallivan | |
| 7,421,386 B2* | 9/2008 | Powell | G06F 17/273 704/10 |
| 7,580,831 B2* | 8/2009 | Haskell | G06F 17/2735 704/10 |
| 7,822,701 B2* | 10/2010 | Carter | G06F 17/2735 706/55 |
| 8,234,106 B2* | 7/2012 | Marcu | G06F 17/2735 704/10 |
| 8,275,803 B2 | 9/2012 | Brown et al. | |
| 8,352,405 B2* | 1/2013 | Fang | G06F 17/2735 706/50 |
| 8,645,378 B2* | 2/2014 | Knight | G06N 5/02 707/737 |
| 8,706,680 B1 | 4/2014 | Macfarlane | |
| 8,862,586 B2 | 10/2014 | Young | |
| 9,336,299 B2* | 5/2016 | Wang | G06F 17/2735 |
| 9,477,759 B2* | 10/2016 | Keysar | G06F 16/9535 |
| 9,645,999 B1* | 5/2017 | Ciulla | G06F 17/2785 |
| 2002/0129012 A1 | 9/2002 | Green | |
| 2004/0172600 A1* | 9/2004 | Evans | G06T 11/206 715/244 |
| 2006/0161535 A1* | 7/2006 | Holbrook | G06Q 40/04 |
| 2006/0212421 A1* | 9/2006 | Oyarce | G06F 16/36 |
| 2009/0046100 A1* | 2/2009 | Evans | G06F 16/24578 345/440 |
| 2009/0287678 A1 | 11/2009 | Brown et al. | |
| 2010/0268725 A1* | 10/2010 | Wang | G06F 17/2735 707/765 |
| 2011/0022597 A1* | 1/2011 | Gallivan | G06F 3/0641 707/738 |
| 2011/0066587 A1 | 3/2011 | Ferrucci et al. | |
| 2011/0125734 A1 | 5/2011 | Duboue et al. | |
| 2011/0191345 A1 | 8/2011 | Young | |
| 2011/0270820 A1* | 11/2011 | Agarwal | G06F 17/273 707/709 |
| 2012/0158703 A1* | 6/2012 | Li | G06F 17/2735 707/723 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0238607 A1 | 9/2013 | Yao et al. | |
| 2017/0262528 A1* | 9/2017 | Potok | G06F 17/2735 |

OTHER PUBLICATIONS

Crossley, Scott A. et al., "Comparing count-based and band-based indices of word frequency: Implications for active vocabulary research and pedagogical applications", Elsevier, ScienceDirect, System 41, Aug. 2, 2013, pp. 965-981.

Good, I. J. , "The Population Frequencies of Species and the Estimation of Population Parameters", Biometrika Trust, http://www.jstor.org/stable/2333344, Biometrika, vol. 40, No. 3/4, Dec. 1953, pp. 237-264.

High, Rob, "The Era of Cognitive Systems: An Inside Look at IBM Watson and How it Works", IBM Corporation, Redbooks, Dec. 12, 2012, 16 pages.

Jun, Zhao et al., "Lexicon Optimization for Chinese Language Modeling", Microsoft Research China, In Proceedings of the ISCSLP-2000, Oct. 1, 2000, 4 pages.

McCord, M.C. et al., "Deep parsing in Watson", IBM J. Res. & Dev. vol. 56 No. 3/4 Paper 3, May/Jul. 2012, pp. 3:1-3:15.

Yagboubi-Notash, Massoud et al., "From Frequency to Instructional Order: Insights from a Narrow-angle Corpus of Psychology RA Introductions", Academy Publisher, Theory and Practice in Language Studies, vol. 3, No. 6, Jun. 2013, pp. 1034-1039.

Yuan, Michael J. , "Watson and healthcare, How natural language processing and semantic search could revolutionize clinical decision support", IBM developerWorks, IBM Corporation, Apr. 12, 2011, 14 pages.

\* cited by examiner

AUTOMATIC CORPUS SELECTION AND HALTING CONDITION DETECTION FOR SEMANTIC ASSET EXPANSION

BACKGROUND

The present application relates generally to an improved data processing apparatus and method and more specifically to mechanisms for automatic corpus selection and halting condition detection for semantic asset expansion.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are the IBM Watson™ system available from International Business Machines (IBM®) Corporation of Armonk, N.Y., Siri® from Apple®, and Cortana® from Microsoft®. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement an automated lexicon expansion for an identified corpus. The method comprises, for a selected corpus in a set of corpora, determining an estimated number of new terms in the selected corpus that are not in the lexicon based on a frequency count of known terms in the selected corpus. The method further comprises, responsive to the estimated number of new terms in the selected corpus being greater than a threshold, performing lexicon expansion using the selected corpus to form an expanded lexicon. The method further comprises, responsive to the estimated number of new terms in the selected corpus not being greater than the threshold, halting lexicon expansion.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Semantic assets, such as lexicons, dictionaries, sets of terms, lists of items, are vital ingredients in natural language processing. Their applicability range is wide and deep from spotting entities to determining sentiment. Creation and curation of these semantic assets can be time consuming if done completely manually. Approaches such as Word2Vec and GLIMPSE enable more rapid creation of such assets by allowing the creator to pick items from a list likely related to the items that are already in the lexicon rather than creating such lists whole cloth.

Word2Vec is a group of related models that are used to produce word embeddings. These models are shallow, two-layer neural networks that are trained to reconstruct linguistic contexts of words. GLIMPSE stands for GLobal IMPlicit Search. While many text indexing schemes create quite large indexes (usually around 50% of the size of the original text), a GLIMPSE-created index is only 2-4% of the size of the original text.

When using the Word2Vec and GLIMPSE iterative approach of picking words from generated related terms, one must determine when to stop adding to the lexicon. The illustrative embodiments provide a mechanism to quantify the tradeoffs of a stopping point and how many new terms can be expected in a given dataset. Given this function, one obvious application of the mechanism is selection from among several corpora for the best corpus to use for semantic asset expansion.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "component," if used herein with regard to describing embodiments and features of the invention, is not intended to be limiting of any particular implementation for accomplishing and/or performing the actions, steps, processes, etc., attributable to and/or performed by the engine. An component may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular component is, unless otherwise specified, for purposes of convenience of reference and not intended to be limiting to a specific implementation. Additionally, any functionality attributed to a component may be equally performed by multiple components, incorporated into and/or combined with the functionality of another component of the same or different type, or distributed across one or more components of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
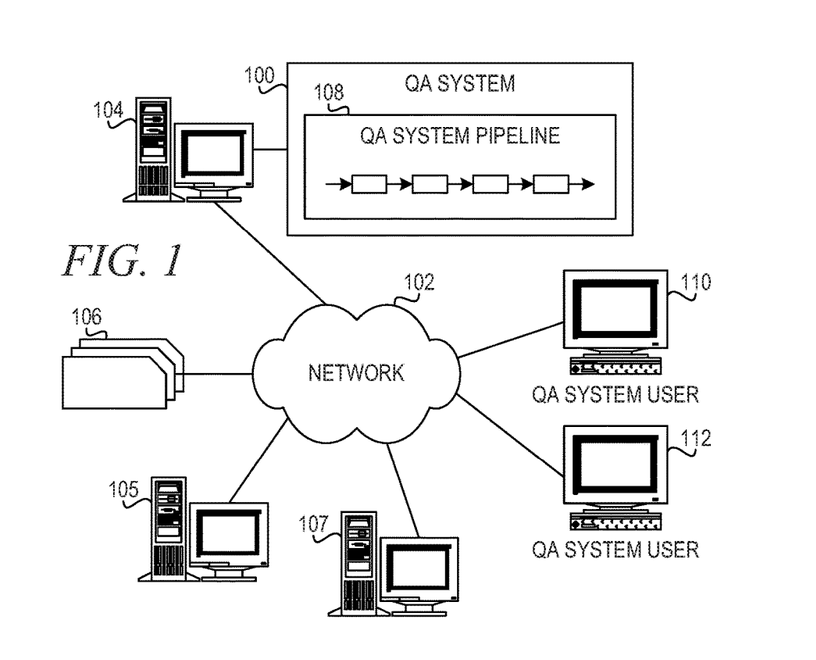
FIG. 1 depicts a schematic diagram of one illustrative embodiment of a question/answer creation (QA) system in a computer network.
Figure 2:
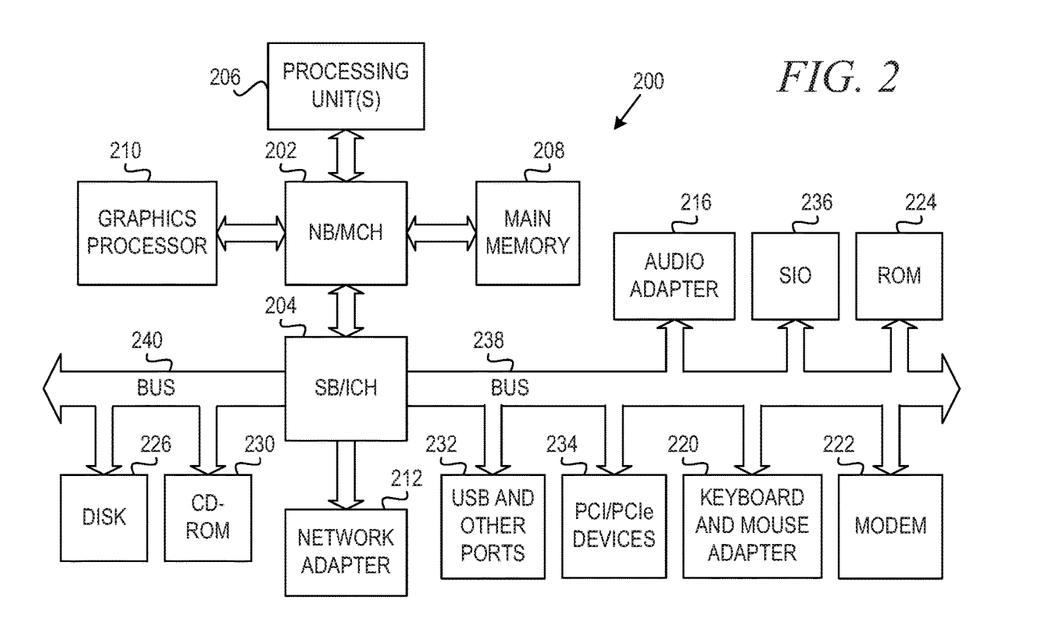
FIG. 2 is a block diagram of an example data processing system in which aspects of the illustrative embodiments are implemented.
Figure 3:
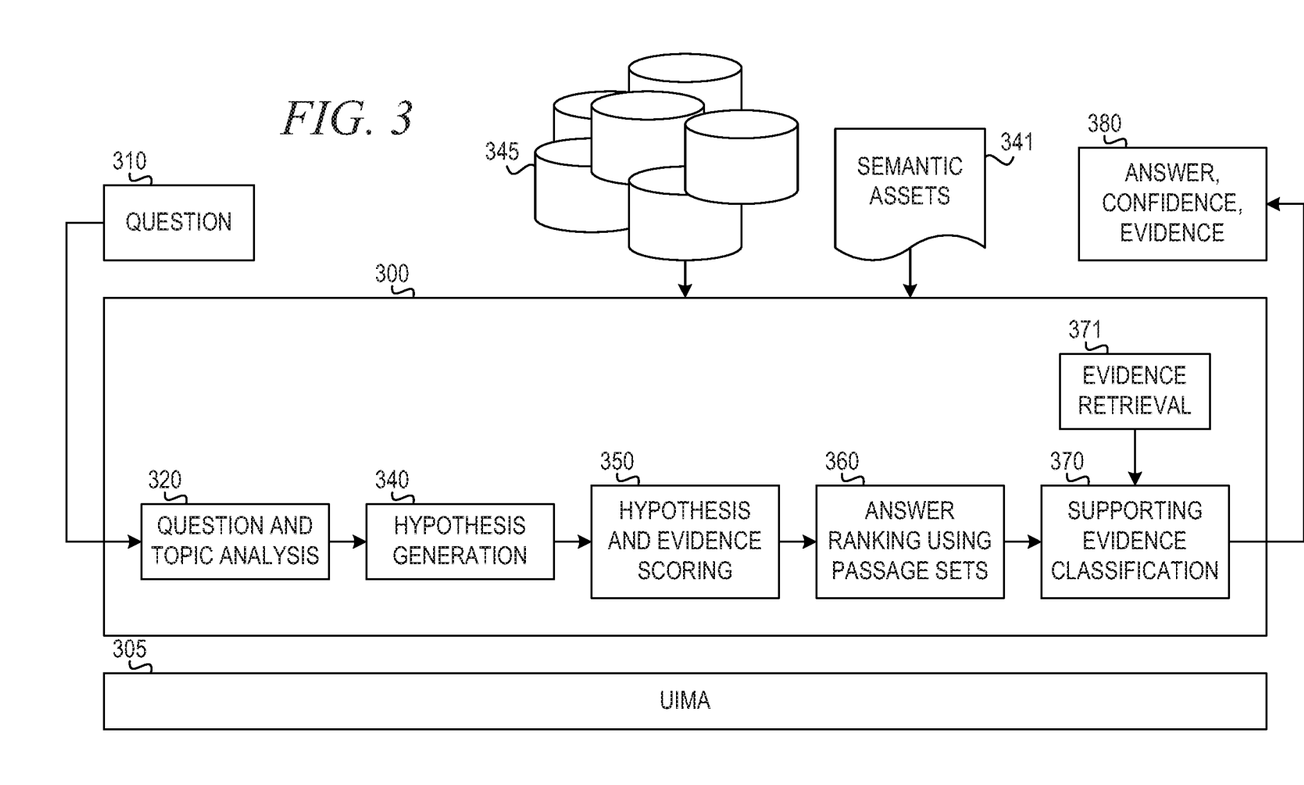
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. The QA system is described as an example of a natural language (NL) processing system. As will be discussed in greater detail hereafter, the illustrative embodiments are integrated in, augment, and extend the functionality of these QA mechanisms with regard to automatic corpus selection and halting condition detection for semantic asset expansion.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

In the illustrative embodiment, the QA system performs natural language processing based on an ontology. In computer science and information science, an ontology is a formal naming and definition of the types, properties, and interrelationships of the entities that really or fundamentally exist for a particular domain of discourse. A lexicon is the vocabulary of a person, language, or branch of knowledge (such as legal or medical). In linguistics, a lexicon is an inventory of lexemes. Linguistic theories generally regard human languages as consisting of two parts: a lexicon, essentially a catalogue of words, and a grammar, a system of rules which allow for the combination of those words into meaningful sentences.

The illustrative embodiments provide mechanisms for selecting corpora for expansion of the lexicon or other semantic assets. The illustrative embodiments then perform lexicon expansion by finding terms in a selected corpus not previously present in the lexicon and then adding the new terms to the lexicon. The illustrative embodiments also provide mechanisms for detecting a halting condition when new terms are unlikely to be discovered with another iteration using another corpus. Thus, the illustrative embodiments halts lexicon expansion when the estimated yield does not warrant the time and processing resources necessary for processing another corpus.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734. The QA system 100 is implemented on one or more computing devices 104, 105, 107 (comprising one or more processors and one or more memories, and potentially any other computing device elements generally known in the art including buses, storage devices, communication interfaces, and the like) connected to the computer network 102. The network 102 includes multiple computing devices 104, 105, 107 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110, 112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104, 105, 107 on the network 102 include access points for content creators and QA system users. Some of the computing devices 104, 105, 107 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 analyzes and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage, the QA system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the QA system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500 s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied to the corpora of data/information 345 in order to generate one or more hypotheses. Hypothesis generation stage includes primary search phase 341 and candidate answer generation stage 342. In primary search phase 341, the queries are generated in any known or later developed information retrieval (IR) query language, such as the Indri, Lucene, or the like. The queries are applied to one or more text indexes storing information about the electronic texts, documents, articles, websites, and the like, that make up the corpora of data/information 345. That is, these various sources themselves, different collections of sources, and the like, represent a different corpus within the corpora 345. There may be different corpora defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus within the corpora 345.

The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In accordance with the illustrative embodiments, the above topic analysis, hypothesis generation, and hypothesis and evidence scoring in stages 320-350 are performed using semantic assets 341. In one embodiment, semantic assets 341 comprise a lexicon, taxonomy, or dictionary with known terms or words and known relationships between terms. Organizations spend considerable time, effort, and resources to craft quality lexicons intended for their analytics processes. The quality of results from the natural language processing, semantic analysis, and analytics processes used in stages 320-350 depend to a large extent on the coverage of the lexicons in corpora 345. In large corpora, achieving good coverage is considerably difficult and time consuming. A typical investment may involve a dozen people working for several days just to refine a small set of lexicons.

The ability to accurately gauge lexicon coverage and identify optimal corpora 345 used to form the semantic assets 341 then becomes increasingly important, because such metrics allow the organization to assess the time and effort for producing semantic assets 341 by avoiding extra unnecessary effort while maximizing the impact or coverage of the lexicons. More importantly, this acts as a proxy to estimate the quality and accuracy of downstream natural language processing, semantic analysis, and analytics processes. Mechanisms for automatic corpus selection and halting condition detection for expansion of semantic are described below with reference to FIGS. 4-9.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence from evidence retrieval 371 that supports the candidate answers from answer ranking phase 360. From the ranked listing of candidate answers in stage 360 and supporting evidence from supporting evidence collection stage 370, QA system pipeline 300 generates a final answer, confidence score, and evidence 380, or final set of candidate answers with confidence scores and supporting evidence, and outputs answer, confidence, and evidence 380 to the submitter of the original input question 310 via a graphical user interface or other mechanism for outputting information.

Figure 4:
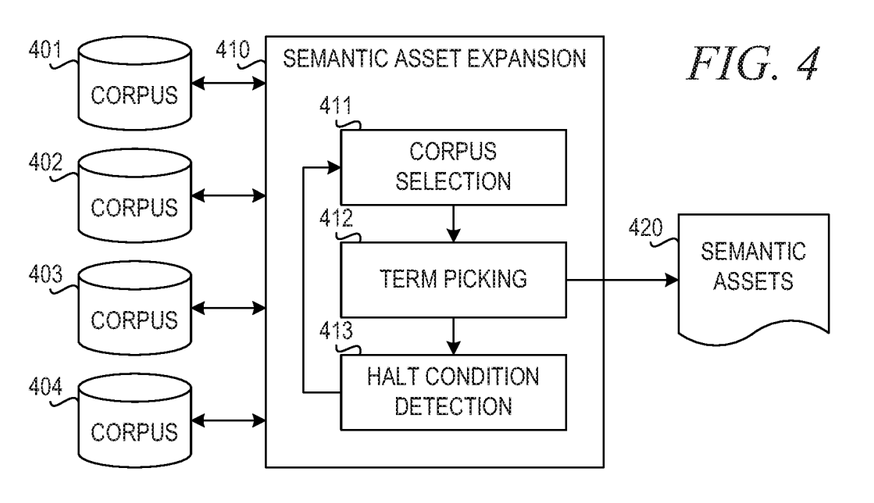
FIG. 4 is a block diagram illustrating a mechanism for semantic asset expansion in accordance with an illustrative embodiment.

FIG. 4 is a block diagram illustrating a system for semantic asset expansion in accordance with an illustrative embodiment. Semantic asset expansion system 410 comprises corpus selection component 411, term picking component 412, and halt condition detection component 413. Semantic asset expansion system 410 generates and expands semantic assets 420 from one or more of corpora 401-404.

In an illustrative embodiment, corpus selection component 411 selects a corpus among corpora 401-404 to generate semantic assets 420. In a first pass, any corpus will be likely to generate a number of new terms and/or relationships for semantic assets 420, such as a lexicon, dictionary, or taxonomy. Term picking component 412 adds words or terms to semantic assets 420. For example, term picking component 412 may use approaches such as Word2vec or GLIMPSE to create semantic assets. Halt condition detection component 413 determines whether a number of new terms from a next corpus warrants sufficient for another iteration of semantic asset expansion.

In one embodiment, semantic asset expansion system 410 starts with a lexicon L made up of terms $T_1 \ldots T_N$. Semantic asset expansion system 410 then queries a given corpus in corpora 401-404 to get a term frequency count for each known term $T_1 \ldots T_N$ in semantic assets 420 to obtain frequency counts $F_1 \ldots F_N$. Semantic asset expansion system 410 sorts $F_1 \ldots F_N$ in descending order.

Figure 5:
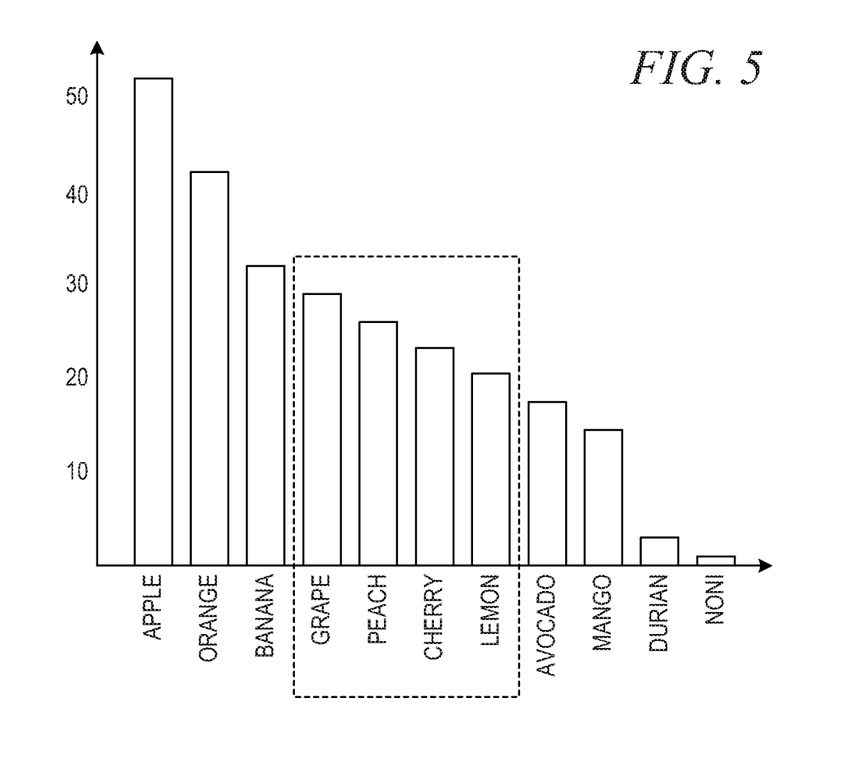
FIG. 5 shows an example graph of frequency counts for known terms in a given corpus in accordance with an illustrative embodiment.

FIG. 5 shows an example graph of frequency counts for known terms in a given corpus in accordance with an illustrative embodiment. The graph shown in FIG. 5 is a very simple example for illustrative purposes. To account for outliers, semantic asset analysis system 410 selects a middle portion using a heuristic. An example heuristic is as follows:

Let start=0.4×N

Let stop=0.6×N

If (start−stop)==0 then stop=start+1

The above heuristic is an example, and the values and other aspects may be modified depending on the implementation. Also, other heuristics may be used to select a representative portion of the term graph to account for outliers. In the depicted example shown in FIG. 5, N=11, start=4, and stop=7. Semantic asset expansion system 410 fits a line to the entries in $F_{start} \ldots F_{stop}$ in the graph. In one embodiment, semantic asset expansion system 410 uses least squares fitting to fit the line to the entries in $F_{start} \ldots F_{stop}$ (in log space). Semantic asset expansion system 410 determines the X-axis intercept. This is the lower bound estimate for total words N' in the lexicon on the given corpus. Semantic asset expansion system 410 then determines an estimate of the number of new words or terms, ΔN, in the given corpus as follows ΔN=N'−N.

Figure 6:
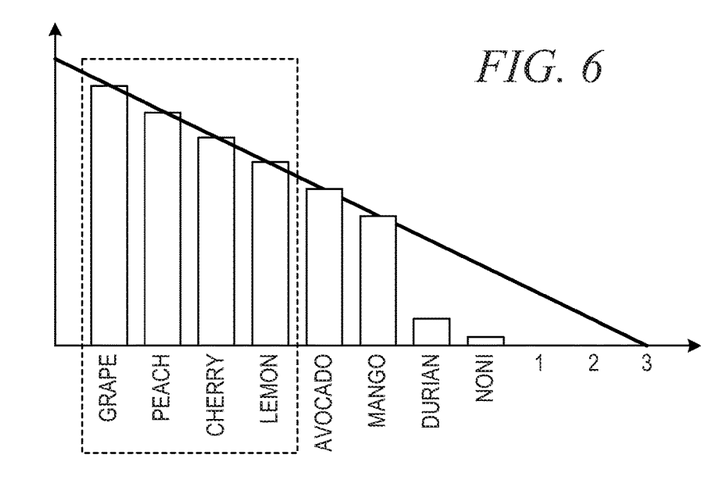
FIG. 6 shows an example graph of frequency counts for known terms in a given corpus with a line fitted to find the X-axis intercept in accordance with an illustrative embodiment.

FIG. 6 shows an example graph of frequency counts for known terms in a given corpus with a line fitted to find the X-axis intercept in accordance with an illustrative embodiment. Because the terms with the highest frequency counts are the most common terms, it is unlikely that another corpus will result in new terms with a higher frequency count than the selected middle portion. In the example depicted in FIG. 6, the line fitted to the selected portion has an X-axis intercept that is three terms beyond the known terms (ΔN=3). Note that FIG. 6 represents a simple example. An actual example would include many more terms and may have a more complex (e.g., higher order) line fit to the selected middle portion.

In one embodiment, corpus selection component 411 determines the estimated number of new terms in each corpus 401-404. Corpus selection component 411 sorts corpora 401-404 by the number of new terms and selects the corpus with the highest estimated number of new terms as the next corpus for term picking component 412 to use for semantic asset expansion.

Halt condition detection component 413 determines whether the estimated number of new terms for the next corpus in the sorted corpora warrants another iteration of semantic asset expansion. In one embodiment, halt condition detection component 413 compares the estimated number of new terms for the next corpus to a threshold and halts semantic asset expansion if the estimated number of new terms is below that threshold. In an example embodiment, the threshold may be determined based on a cost/benefit analysis comparing a resource and time cost of running another iteration to a number of estimated number of new terms that would result. As an example, one may set the threshold to be one (1) such that the semantic asset expansion system performs another iteration of semantic asset expansion as long as at least one new term is likely to result. However, due to the resource cost of running the semantic expansion algorithms, a higher value for the threshold may be selected to increase the benefit relative to the cost.

In one embodiment, corpus selection 411 may repeat the above calculation for the estimated number of new terms for all corpora 401-404 and sort corpora 401-404 for each iteration. Each corpus 401-404 may have a different set of new terms and the new terms added to semantic assets 420 in the last iteration may alter the sort order of corpora 401-404.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
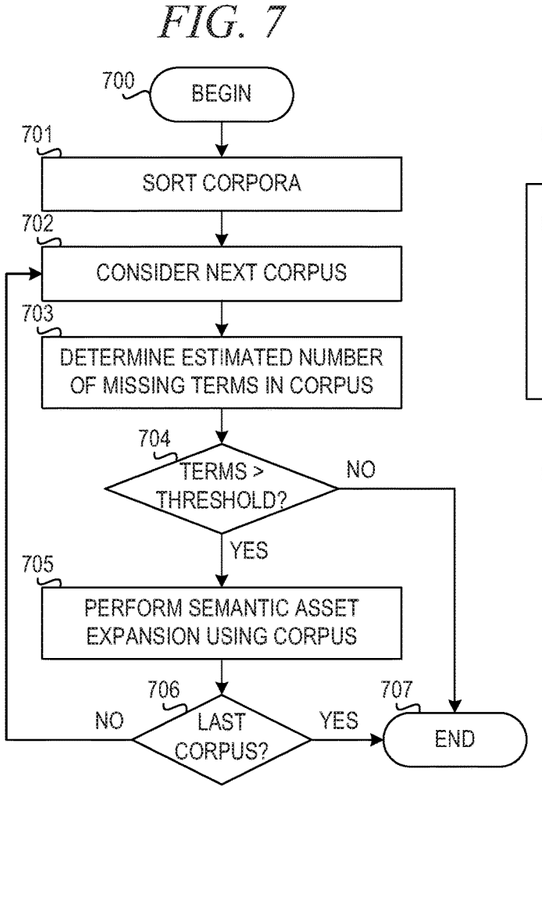
FIG. 7 is a flowchart illustrating operation of a system for automatic corpus selection and halting condition detection for semantic asset expansion in accordance with an illustrative embodiment.

FIG. 7 is a flowchart illustrating operation of a system for automatic corpus selection and halting condition detection for semantic asset expansion in accordance with an illustrative embodiment. Operation begins (block 700), and the system sorts corpora in an order to be considered for semantic asset expansion (block 701). In one embodiment, the system may sort corpora in descending order of estimated number of new terms in each corpus, as illustrated below with reference to FIG. 8.

The system considers the first (next) corpus (block 702). The system determines an estimated number of missing terms in the corpus (block 703). Operation of determining the estimated number of missing terms in a corpus is described below with reference to FIG. 9. The system then determines whether the estimated number of missing terms is greater than a threshold (block 704). If the estimated number of missing terms is greater than the threshold, then the system performs semantic asset expansion using the corpus (block 705).

The system then determines whether the corpus is the last corpus in the corpora (block 706). If the currently considered corpus is not the last corpus, then operation returns to block 702 to consider the next corpus. If the currently considered corpus is the last corpus in block 706 or the estimated number of new terms in the current corpus is not greater than the threshold in block 704, then the system halts semantic asset expansion and operation ends (block 707).

Figure 8:
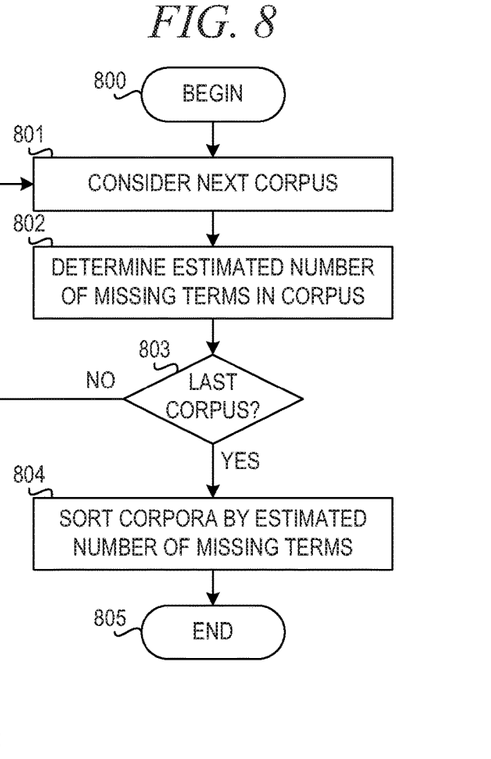
FIG. 8 is a flowchart illustrating operation of a mechanism for sorting corpora by estimated number of new terms in accordance with an illustrative embodiment.

FIG. 8 is a flowchart illustrating operation of a mechanism for sorting corpora by estimated number of new terms in accordance with an illustrative embodiment. Operation begins (block 800), and the mechanism considers the first (next) corpus (block 801). The mechanism determines an estimated number of missing terms in the corpus (block 802). Operation of determining the estimated number of missing terms in a corpus is described below with reference to FIG. 9. The mechanism determines whether the corpus is the last corpus in the corpora (block 803). If the currently considered corpus is not the last corpus, then operation returns to block 801 to consider the next corpus. If the corpus is the last corpus in block 803, then the mechanism sorts the corpora by estimated number of missing terms (block 804). Thereafter, operation ends (block 805).

Figure 9:
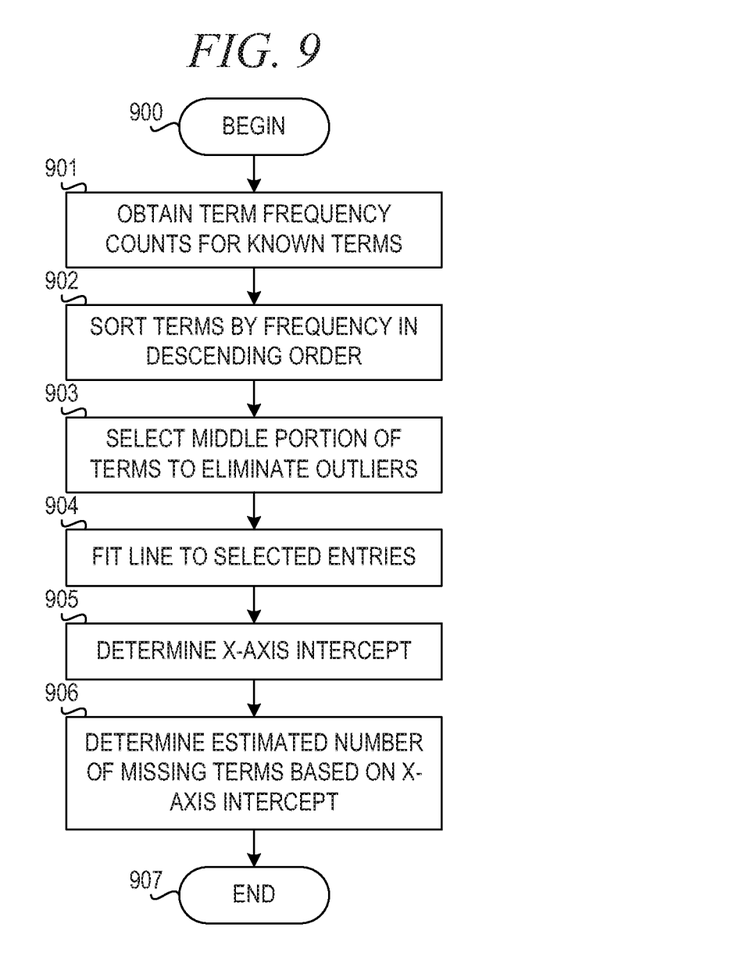
FIG. 9 is a flowchart illustrating operation of a mechanism for determining an estimated number of missing terms in a corpus in accordance with an illustrative embodiment.

FIG. 9 is a flowchart illustrating operation of a mechanism for determining an estimated number of missing terms in a corpus in accordance with an illustrative embodiment. Operation begins (block 900), and the mechanism obtains term frequency counts in the corpus for known terms (block 901). The mechanism sorts the known terms by frequency in descending order (block 902). The mechanism then selects a middle portion of the known terms to eliminate outliers (block 903). An example heuristic for selecting a middle portion is as follows:

Let start=$0.4 \times N$
Let stop=$0.6 \times N$
If (start−stop)==0 then stop=start+1

The above heuristic is an example, and the values and other aspects may be modified depending on the implementation. Also, other heuristics may be used to select a representative portion of the term graph to account for outliers.

The mechanism then fits a line to the selected entries in the middle portion of the known terms (block 904). The mechanism determines an X-axis intercept of the line (block 905). The mechanism determines the estimated number of missing terms based on the X-axis intercept (block 906). Thereafter, operation ends (block 907).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A first multi-instance learned model is trained based on whether a passage set returned for a given candidate answer collectively does or does not support a correct answer. A second multi-instance learned model is for instance-level classification and tries to distill what, in the individual passage feature vectors, led to the overall judgement of the polarity of the passage set label. Between the two models, the QA system pipeline has the complementary capabilities for answer ranking and passage ranking. A supporting evidence collection stage scores the evidence and offers the user justification as appropriate for the candidate answer chosen.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to implement an automated lexicon expansion for an identified corpus, wherein the computer readable program causes the computing device to:

for each given corpus in the set of corpora, determine an estimated number of new terms in the given corpus that are not in the lexicon based on a frequency count known terms in the given corpus; and sort the set of corpora by estimated number of new terms to form a sorted set of corpora;

select a corpus having a highest estimated number of new terms as a selected corpus for lexicon expansion;

determine an estimated number of new terms in the selected corpus that are not in the lexicon based on a frequency count of known terms in the selected corpus, wherein determining the estimated number of new terms in the selected corpus comprises:
    identifying a set of known terms in the lexicon;
    for each known term in the lexicon, identifying an associated frequency of occurrence of the known term in the selected corpus;
    sorting the set of known terms based on the associated frequency of occurrence thereby forming a sorted set of known terms;
    fitting a line to a portion of the sorted set of known terms;
    determining an X-axis intercept of the line;
    determining the estimated number of new terms in the selected corpus based on the X-axis intercept of the line; and
    subtracting a number of terms in the sorted set of known terms from the X-axis intercept;

responsive to the estimated number of new terms in the selected corpus being greater than a threshold, perform lexicon expansion using the selected corpus to form an expanded lexicon; and responsive to the estimated number of new terms in the selected corpus not being greater than the threshold, halt lexicon expansion.

2. The computer program product of claim 1, wherein the computer readable program further causes the computing device to:
    responsive to performing lexicon expansion using the selected corpus, repeat determining the estimated number of new terms in each corpus that are not in the lexicon and sorting the set of corpora by estimated number of new terms to form a new sorted set of corpora.

3. The computer program product of claim 2, wherein the computer readable program further causes the computing device to select a corpus having a highest estimated number of new terms in the new sorted set of corpora as the selected corpus for a next lexicon expansion.

4. The computer program product of claim 1, wherein determining the estimated number of new terms in the given corpus comprises:
    identifying a set of known terms in the lexicon;
    for each known term in the lexicon, identifying an associated frequency of occurrence of the known term in the given corpus;
    sorting the set of known terms based on the associated frequency of occurrence thereby forming a sorted set of known terms;
    fitting a line to a portion of the sorted set of known terms;
    determining an X-axis intercept of the line; and
    determining the estimated number of new terms in the given corpus based on the X-axis intercept of the line.

5. An apparatus comprising:
a processor; and
a memory coupled to the processor, wherein the memory comprises instructions which, when executed by the processor, cause the processor to implement an automated lexicon expansion for an identified corpus, wherein the instructions cause the processor to:
for each given corpus in the set of corpora, determine an estimated number of new terms in the given corpus that are not in the lexicon based on a frequency count known terms in the given corpus; and sort the set of corpora by estimated number of new terms to form a sorted set of corpora;

select a corpus having a highest estimated number of new terms as a selected corpus for lexicon expansion;

determine an estimated number of new terms in the selected corpus that are not in the lexicon based on a frequency count of known terms in the selected corpus, wherein determining the estimated number of new terms in the selected corpus comprises:
    identifying a set of known terms in the lexicon;
    for each known term in the lexicon, identifying an associated frequency of occurrence of the known term in the selected corpus;
    sorting the set of known terms based on the associated frequency of occurrence thereby forming a sorted set of known terms;
    fitting a line to a portion of the sorted set of known terms;
    determining an X-axis intercept of the line;
    determining the estimated number of new terms in the selected corpus based on the X-axis intercept of the line; and
    subtracting a number of terms in the sorted set of known terms from the X-axis intercept;

responsive to the estimated number of new terms in the selected corpus being greater than a threshold, perform lexicon expansion using the selected corpus to form an expanded lexicon; and responsive to the estimated number of new terms in the selected corpus not being greater than the threshold, halt lexicon expansion.

6. The apparatus of claim 5, wherein the instructions further cause the processor to:
    responsive to performing lexicon expansion using the selected corpus, repeat determining the estimated number of new terms in each corpus that are not in the lexicon and sorting the set of corpora by estimated number of new terms to form a new sorted set of corpora.

7. The apparatus of claim 6, wherein the instructions further cause the processor to select a corpus having a highest estimated number of new terms in the new sorted set of corpora as the selected corpus for a next lexicon expansion.

8. The apparatus of claim 5, wherein determining the estimated number of new terms in the given corpus comprises:
    identifying a set of known terms in the lexicon;
    for each known term in the lexicon, identifying an associated frequency of occurrence of the known term in the given corpus;
    sorting the set of known terms based on the associated frequency of occurrence thereby forming a sorted set of known terms;
    fitting a line to a portion of the sorted set of known terms;
    determining an X-axis intercept of the line; and
    determining the estimated number of new terms in the given corpus based on the X-axis intercept of the line.

* * * * *